US008939245B2

(12) United States Patent
Jaffrezic

(10) Patent No.: US 8,939,245 B2
(45) Date of Patent: Jan. 27, 2015

(54) SYSTEM FOR CONNECTING BATTERIES FOR AN ELECTRIC VEHICLE AND ASSOCIATED SET OF BATTERIES

(75) Inventor: Xavier Jaffrezic, Guyancourt (FR)

(73) Assignee: Renault S.A.S., Boulogne-Billancourt (FR)

(*) Notice: Subject to any disclaimer, the term of this patent is extended or adjusted under 35 U.S.C. 154(b) by 6 days.

(21) Appl. No.: 13/577,102

(22) PCT Filed: Feb. 4, 2011

(86) PCT No.: PCT/FR2011/050225
§ 371 (c)(1),
(2), (4) Date: Aug. 3, 2012

(87) PCT Pub. No.: WO2011/104460
PCT Pub. Date: Sep. 1, 2011

(65) Prior Publication Data
US 2012/0298435 A1 Nov. 29, 2012

(30) Foreign Application Priority Data

Feb. 24, 2010 (FR) ...................... 10 51316

(51) Int. Cl.
B60K 1/04 (2006.01)
B60L 3/00 (2006.01)
(Continued)

(52) U.S. Cl.
CPC ................ B60K 1/04 (2013.01); B60L 3/0046 (2013.01); B60L 11/14 (2013.01); B60L 11/1822 (2013.01); B60L 11/1838 (2013.01); H01M 10/425 (2013.01); B60K 2001/0455 (2013.01);
(Continued)

(58) Field of Classification Search
CPC .......................... B60K 2001/0455; B60S 5/06
USPC ....................... 180/65.29, 68.5; 320/109, 112
See application file for complete search history.

(56) References Cited

U.S. PATENT DOCUMENTS 3,497,027 A * 2/1970 Wild ..................... 180/65.245
5,187,423 A * 2/1993 Marton ...................... 320/109
(Continued)

FOREIGN PATENT DOCUMENTS

DE 10 2007 032 210 10/2008
EP 1 372 125 12/2003
(Continued)

OTHER PUBLICATIONS

French Preliminary Search Report issued Oct. 12, 2010, in Patent Application No. FR 1051316 (with English translation of Category of Cited Documents).
(Continued)

Primary Examiner — Frank Vanaman
(74) Attorney, Agent, or Firm — Oblon, Spivak, McClelland, Maier & Neustadt, L.L.P.

(57) ABSTRACT

A system for connecting a set of batteries configured to supply at least one electric motor for powering a motor vehicle and configured to be accommodated inside a compartment provided on the vehicle. Each battery includes a logic processing unit, a communication module, and a mechanism for connecting to the motor. The vehicle includes a logic processing unit connected to a stationary auxiliary battery, a communication module capable of communicating with the communication module of each battery, and a mechanism for locking and blocking the batteries in position.

5 Claims, 2 Drawing Sheets

(51) Int. Cl.
  *B60L 11/14* (2006.01)
  *B60L 11/18* (2006.01)
  *H01M 10/42* (2006.01)
  *H01M 10/48* (2006.01)

(52) U.S. Cl.
  CPC ....... *H01M10/48* (2013.01); *H01M 2010/4278* (2013.01); *H01M 2220/20* (2013.01); *Y02T 10/7005* (2013.01); *Y02T 10/7072* (2013.01); *Y02T 10/7077* (2013.01); *Y02T 90/124* (2013.01); *Y02T 90/128* (2013.01); *Y02T 90/14* (2013.01); *Y02T 90/163* (2013.01); *Y02T 90/16* (2013.01)
  USPC ...................................................... 180/68.5

(56) References Cited

U.S. PATENT DOCUMENTS

| | | | |
|---|---|---|---|
| 5,373,910 A * | 12/1994 | Nixon | 180/65.1 |
| 5,406,778 A * | 4/1995 | Lamb et al. | 56/7 |
| 5,412,293 A * | 5/1995 | Minezawa et al. | 318/376 |
| 5,520,258 A * | 5/1996 | Kemshall | 180/68.5 |
| 5,831,415 A * | 11/1998 | Rudolph et al. | 320/112 |
| 6,091,764 A * | 7/2000 | Silk et al. | 375/219 |
| 6,396,408 B2 * | 5/2002 | Drummond et al. | 340/815.4 |
| 6,690,268 B2 * | 2/2004 | Schofield et al. | 340/438 |
| 8,342,279 B1 * | 1/2013 | Florus et al. | 180/68.5 |
| 2010/0071979 A1 * | 3/2010 | Heichal et al. | 180/68.5 |
| 2010/0114762 A1 | 5/2010 | Ishii | |
| 2010/0145717 A1 | 6/2010 | Hoeltzel | |
| 2013/0030608 A1 * | 1/2013 | Taylor et al. | 701/2 |

FOREIGN PATENT DOCUMENTS

| | | |
|---|---|---|
| FR | 2 880 476 | 7/2006 |
| WO | 2008 123543 | 10/2008 |

OTHER PUBLICATIONS

International Search Report Issued May 30, 2011 in PCT/FR11/50225 Filed Feb. 4, 2011.

* cited by examiner

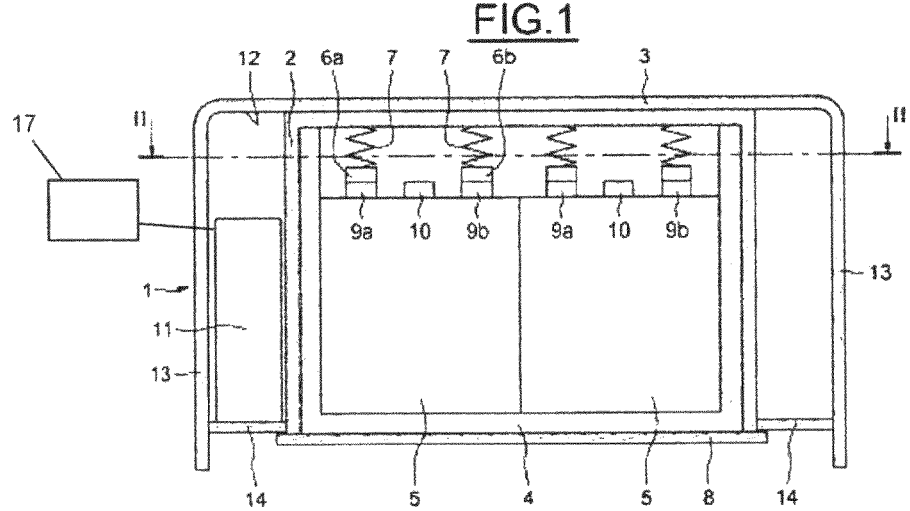
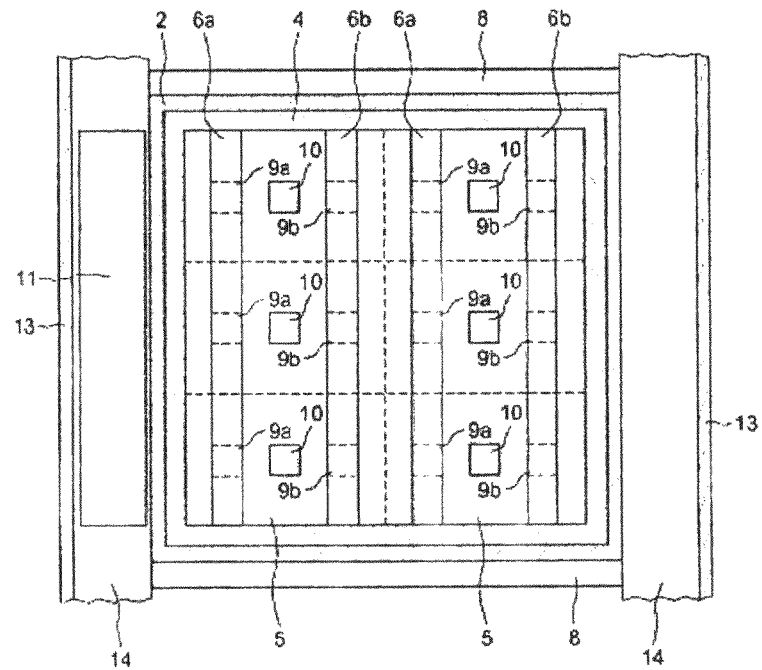

SYSTEM FOR CONNECTING BATTERIES FOR AN ELECTRIC VEHICLE AND ASSOCIATED SET OF BATTERIES

The invention relates to electrically propelled motor vehicles comprising batteries designed to be accommodated in a compartment provided on the vehicle.

More particularly, the invention relates to the connection systems for connecting batteries to the electric motor of a motor vehicle.

Today, the batteries present in electric vehicles have a relatively short range. In order to respond to the need of consumers, the batteries have been modified so as to become removable in order to be rapidly exchanged when they are flat. The batteries are placed in a battery pack, then the battery pack is inserted into a dedicated compartment situated beneath the floor of the vehicle. The battery pack must therefore be easily accessible so that the batteries are rapidly replaced when they are discharged, so as to provide the vehicle user with a longer range. This replacement operation must be both rapid and perfectly protected.

Attempts have already been made in the prior art to achieve this objective.

In this respect reference can be made to document FR 2 798 342 which proposes a device allowing the easy and rapid interchangeability of a battery pack in an electric vehicle. A battery pack is inserted under the chassis of an electric vehicle, then immobilized in position by hooks. A smart card is situated on the battery pack and makes it possible to ascertain the cost of charging the battery pack. This document does not allow a protected electric connection to be obtained between the batteries and the electric motor of a vehicle.

Reference may also be made to document WO 02/04275 which describes the insertion of a battery into a compartment provided under the chassis of an electric vehicle and means for locking the battery in the compartment. When the battery is inserted into the compartment, its terminals are in contact with electric means of the vehicle thus making possible an energy interchange between the battery and the vehicle. The electric contact between the batteries and the vehicle is created when the battery is inserted into the compartment. No verification that the battery is immobilized in position and locked is carried out before the electric connection of the battery to the electric motor.

The solutions proposed in the prior art do not make it possible to carry out a perfectly protected battery-replacement operation.

BRIEF SUMMARY

The object of the invention is therefore to alleviate these drawbacks and to provide a battery-pack connection system that is rapid, automated and protected, in order to minimize the energy interchanges between the battery and the vehicle when the battery is not properly positioned and locked into a dedicated compartment in the vehicle, and to minimize the risks of short circuiting the batteries.

In one embodiment, the invention relates to a connection system for a battery pack designed to power at least one electric motor for propelling a motor vehicle and designed to be accommodated in a compartment provided on the vehicle.

Each battery comprises a logical processing unit, a communication module and connection means for connection to the motor. The vehicle comprises a logical processing unit connected to a fixed auxiliary battery, a communication module capable of communicating with the communication module of each battery and means for locking and immobilizing the batteries in position. The battery uses its own energy to provide the communication between the communication modules. In this manner, no energy interchange takes place between the batteries and the vehicle until the batteries receive an authorization signal from the communication module of the vehicle.

The connection system also comprises means for locking and closing the compartment and a first detection means associated with the vehicle. The first detection means is capable of detecting the state of the means for locking and closing the compartment.

Advantageously, the connection system comprises a second detection means associated with each of the batteries and/or with the vehicle. The second detection means is capable of detecting the state of the means for locking and immobilizing each battery in position. In this manner, the safety of the connection system is enhanced by a double check of the means for locking and immobilizing the batteries in position.

The connection means may comprise a mechanical actuating device capable of connecting the batteries to the electric motor of the vehicle. The mechanical device may be of the microactuator type.

The connection means may comprise an electric actuating device capable of connecting the batteries to the electric motor of the vehicle. The electric device may be of the relay type.

Advantageously, the communication modules of the batteries and of the vehicle may comprise optical data interchange means.

The communication modules of the batteries and of the vehicle may also comprise radiowave receiving and transmitting means.

According to the second aspect, the invention relates to a battery pack designed to power at least one electric motor for propelling a motor vehicle. Each battery comprises a logical processing unit, a communication module and connection means for connection to the vehicle.

Advantageously, each battery comprises a detection means for detecting its locking and its immobilization in position.

The connection means may comprise a mechanical actuating device or an electric actuating device capable of connecting the batteries to the electric motor of the vehicle.

The communication modules of the battery pack and of the vehicle may comprise optical data interchange means or radiowave receiving and transmitting means.

BRIEF DESCRIPTION OF THE DRAWINGS

Other objects, features and advantages of the invention will emerge on reading the following description, given only as a nonlimiting example, and made with reference to the appended drawings in which:

FIG. 1 represents very schematically a view in section of a vehicle chassis fitted with a battery pack according to the invention;

FIG. 2 represents a view in section along II-II of FIG. 1;

DETAILED DESCRIPTION

Figure 3:
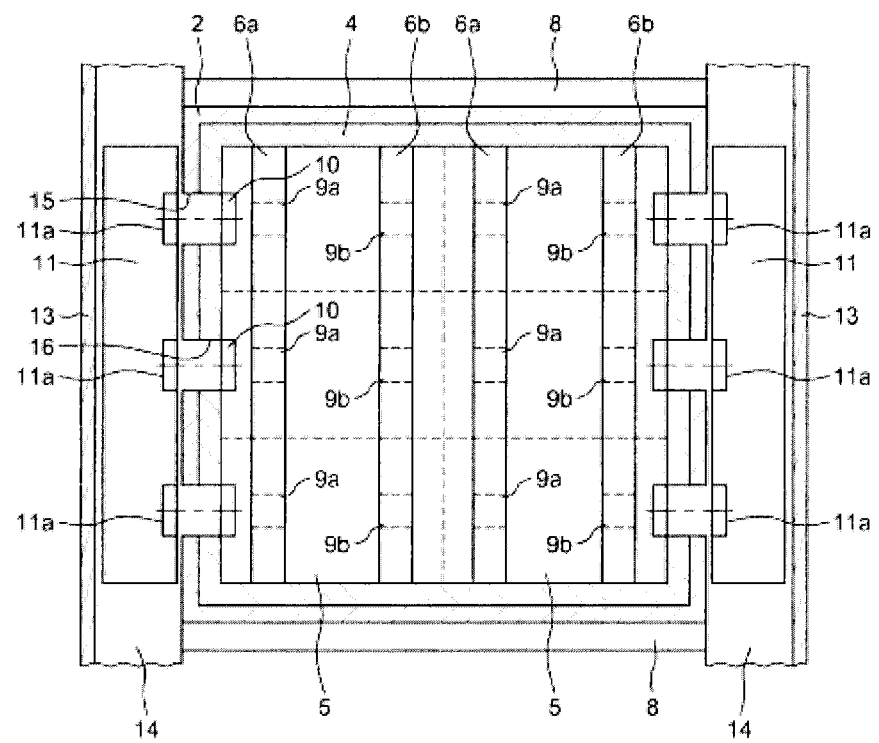
FIG. 3 represents another embodiment of FIG. 2.

The chassis 1 of a vehicle shown in FIG. 1 comprises a compartment 2 fixed under the floor 3 of the vehicle. The compartment 2 is adapted to receive a pack 4 of batteries 5 in order to electrically connect them to the vehicle with the aid of connection means 6 fixed to the vehicle with the aid of means 7. The connection means 6a correspond to the positive pole and the connection means 6b correspond to the negative pole. The batteries 5 may, as a nonlimiting example, be situated in two rows. However, it is possible to envisage inserting a number of rows of batteries 5 that is greater than two in the compartment 2, depending on the energy requirement.

The battery pack 4 is enclosed in the compartment 2 with the aid of a means 8 for closing the compartment 2.

Each battery 5 comprises terminals 9 and a communication means 10. The terminals 9 are two in number. One of the terminals 9a corresponds to the positive pole and the other terminal 9b corresponds to the negative pole. The connection means 6a and 6b situated on the vehicle are two in number, so as to be in contact respectively with the positive pole of each of the batteries 5 and the negative pole of each of the batteries 5. These connection means 6a and 6b are then linked to the power supply of the electric motor of the vehicle (not shown) in order to electrically propel the latter.

Figure 4:
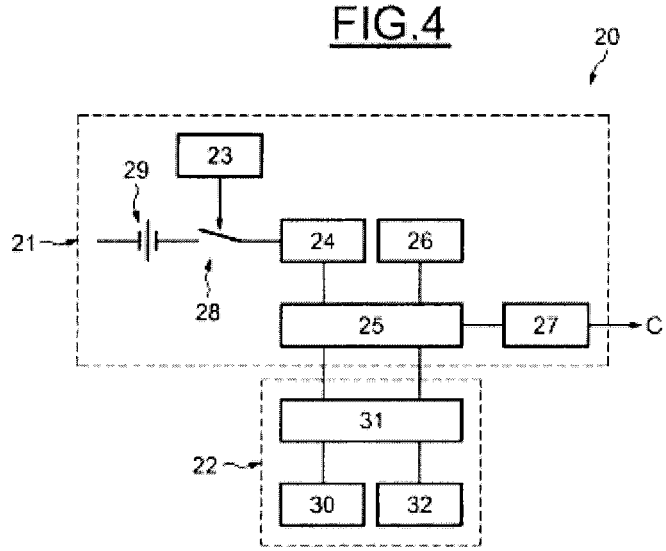
FIG. 4 illustrates schematically the main elements of a system for connecting batteries to a vehicle according to the invention.

The communication means 10 comprises a communication module connected to a logical processing unit as will be seen when studying FIG. 4. The logical processing unit of the communication means 10 is called "movable" because it is fixed to one of the removable batteries 5. The batteries 5 use their own energy to power their communication means 10.

The chassis 1 of the vehicle also comprises a communication means 11 situated in a housing 12 between the compartment 2 and the bodywork 13 of said vehicle. The communication means 11 is fixed to a support 14 and comprises a communication module and a logical processing unit as will be seen when studying FIG. 4. The communication module of the vehicle is configured so as to communicate with each communication module situated on each battery 5. The communication module of the communication means 11 is connected to the logical processing unit that is called "fixed" because it is situated on the vehicle. The vehicle comprises a fixed auxiliary battery 17 allowing the communication means 11 to operate without energy interchange with the batteries 5.

FIG. 2 represents a view in section of the chassis 1 along II-II of FIG. 1. The batteries 5 are, as a nonlimiting example, six in number. Each of the batteries 5 comprises two terminals 9a and 9b. The connection means 6a and 6b situated on the vehicle are contact bars, so as to be in contact respectively with the positive pole 6a of the batteries 5 and the negative pole 6b of the batteries 5. These connection means 6a and 6b are then linked to the power supply of the electric motor of the vehicle (not shown) in order to allow the latter to be electrically propelled.

The communication means 10 and 11 may comprise radio-wave receiving and transmitting means (not shown).

This embodiment requires the establishment of a protected and encrypted protocol so that external waves cannot interfere with the communication means 10 and 11.

In the embodiment illustrated in FIG. 3, the communication means 10 and 11 may comprise, as an example, optical data interchange means (not shown). Each battery comprises a window 10 through which optical means (not shown) can interchange data with 11a optical means situated on the vehicle so that the data interchange can take place only if the battery 5 is correctly placed in the compartment 2. The data interchange is possible only if the compartment 2 comprises a window 15 and the battery pack 4 also comprises a window 16. The windows 10, 16, 15 and the 11a optical means are on the same axis, so as to allow the optical data stream to pass. The communication means 11 are two in number, so as to communication with the two rows of batteries 5.

Communication between the batteries 5 and the vehicle via optical data interchange means provides double security of immobilizing the battery 5 in position because communication is not possible if the battery 5 is not correctly positioned. Moreover, the presence of light is easily detected with the aid of optical means. In this manner, it is easy to detect whether the compartment 2 is properly closed.

With reference now to FIG. 4, which illustrates as an example the main elements of a connection system for connecting a battery pack to a vehicle, the connection system 20 comprises a module 21 associated with each battery 5 and a module 22 associated with the vehicle.

The module 21 comprises an activation means 23, a movable logical processing unit 24, a communication module 25, a detection means 26 for detecting whether the battery 5 is locked and immobilized in position, and an electric connection means 27 for connecting the battery 5 to the electric motor of the vehicle. The activation means 23 powers the movable logical processing unit 24 via a contactor 28 and a power supply 29 for the batteries 5 when the battery pack 4 is engaged in the compartment 2 illustrated in FIG. 2.

The module 22 comprises a fixed logical processing unit 30, a communication module 31 and detection means 32 for detecting the locking and closing of the compartment 2 and the locking of the battery 5. The communication module 25 is capable of communicating with the communication module 31.

The battery can be locked, as a nonlimiting example, manually. However, the locking can be of the electromechanical type. The state of locking and of immobilization of the battery 5 in position is verified both by the vehicle and/or by the battery. The state of closure and of locking of the compartment 2 is verified only by the vehicle. It would be possible to envisage the state of closure and of locking of the compartment 2 to be verified also by each of the batteries 5.

When the battery 5 is outside the vehicle, the connection means 27 is not activated. Thus the risks of handling and of short circuiting can be prevented. The movable logical processing unit 24 powered by the energy of the battery 5 is also inactive outside the vehicle so as to prevent unnecessary discharging of the battery.

When the battery pack 4 is inserted in the compartment 2, the activation means 23 activates the movable logical processing unit 24 via the contactor 28. The moveable logical processing unit 24 establishes communication between the communication module 25 of the battery 5 and the communication module 31 of the vehicle. The communication module 25 makes a request to the communication module 31 to ascertain whether the connection means 27 can be activated. The request is made in a continuous loop until the authorization to connect is obtained from the communication module 31. Each of the communication modules 25 and 31 verifies that the corresponding battery 5 is correctly locked and immobilized in position in the compartment 2. The detection means 26 and 32 for detecting the locking and immobilization of the battery 5 in position send signals reflecting the locked and positioned state of the battery 5 respectively to the communication modules and 31. The detection means 32 also makes it possible to verify the locked and closed state of the compartment 2.

When the communication module 31 receives the signal that the compartment 2 is locked and closed, it responds positively to the request sent by the communication module 25. Once the positive response has been received by the communication module 25, and once the communication module 25 has also received the signal reflecting the locked and immobilized state of the battery 5 in position via the means 26, the communication module 25 activates the connection means 27. The connection means 27 allows the connection C of the battery 5 to the electric motor of the vehicle.

The connection means 27 may be of several types. As a nonlimiting example, the batteries illustrated in FIGS. 1, 2 and 3 are batteries 5 with exposed terminals 9. In this embodiment, the terminals 9a and 9b of the batteries 5 are inert and do not interchange energy. The connection means 27 may, in this case, consist of a relay for powering up the terminals 9a and 9b and electrically connecting C the battery 5 to the electric motor of the vehicle.

However, it can be envisaged to use batteries with active masked terminals. In this embodiment, the connection means 27 may comprise a microactuator that is used to actuate the terminals of the battery so as to make them exposed. The latter embodiment has the advantage of protecting the terminals of the battery during handling.

By virtue of the invention that has just been described, the connection of the battery packs designed to power an electric motor for propelling a motor vehicle is protected, rapid and automated.

The invention allows the users of electric vehicles to change their batteries simply and rapidly so as to have as long a range as with a heat engine. Each of the batteries and the vehicle are considered to be standalone system communicating with one another so as to connect the batteries to the electric motor only when all the safety parameters have been verified by the vehicle and/or by each of the batteries. In this manner, the replacement of flat batteries with charged batteries is totally protected and can be carried out more rapidly.

The invention claimed is:

1. A connection system for a battery pack configured to power at least one electric motor for propelling a motor vehicle and configured to be accommodated in a compartment provided on the vehicle; the battery pack including at least one battery, the battery comprising a logical processing unit, a communication module, and connection means for connection to the motor; and the vehicle comprising a logical processing unit connected to a fixed auxiliary battery, a communication module capable of communicating with the communication module of the battery, and means for locking and immobilizing the battery in position; the system comprising
    means for locking and closing the compartment; and
    a first detection means associated with the vehicle, the first detection means being configured to detect the state of the means for locking and closing the compartment and, when the compartment is locked and closed, the first detection means sends a signal to the communication module of the vehicle indicating that the compartment is locked and closed;
    a second detection means associated with the battery, the second detection means being configured to detect a state of the means for locking and immobilizing the battery in position and, when the battery is locked and immobilized, the second detection means sends a signal to the communication module of the battery indicating that the battery is locked and immobilized, wherein
    when the communication module of the vehicle receives the signal from the first detection means indicating that the compartment is locked and closed, the communication module of the vehicle sends a signal to the communication module of the battery indicating that the compartment is locked and closed, and
    when the communication module of the battery receives the signal from the communication module of the vehicle indicating that the compartment is locked and closed and receives the signal from the second detection means that the battery is locked and immobilized, the communication module of the battery activates the connection means to connect the battery to the motor.

2. The connection system as claimed in claim 1, wherein the connection means comprises a mechanical actuating device configured to connect the battery to the electric motor of the vehicle.

3. The connection system as claimed in claim 1, wherein the connection means comprises an electric actuating device capable of connecting the battery to the electric motor of the vehicle.

4. The connection system as claimed in claim 1, wherein the communication modules of the battery and of the vehicle comprise optical data interchange means.

5. The connection system as claimed in claim 1, wherein the communication modules of the battery and of the vehicle comprise radiowave receiving and transmitting means.

* * * * *